(No Model.)  
2 Sheets—Sheet 2.

G. D. GERSON.
APPARATUS FOR FILTERING WATER.

No. 402,433.  
Patented Apr. 30, 1889.

Witnesses.  
Walter Scott  
J. Thomas Sothern

Inventor,  
George David Gerson  
By Paine Ladd,  
Attys.

UNITED STATES PATENT OFFICE.

GEORGE DAVID GERSON, OF HAMBURG, GERMANY.

APPARATUS FOR FILTERING WATER.

SPECIFICATION forming part of Letters Patent No. 402,433, dated April 30, 1889.

Application filed December 4, 1888. Serial No. 292,611. (No model.)

*To all whom it may concern:*

Be it known that I, GEORGE DAVID GERSON, a subject of the Emperor of Germany, residing at Hamburg, in the German Empire, have invented certain new and useful Improvements in Apparatus for Filtering Water, of which the following is a specification.

This invention relates to improvements in water-filters, and the object of the same is to provide means for continuously purifying water by first separating matters mechanically suspended in the water to obtain clear water for industrial purposes, and then converting the latter, by means of a second filtration, into water suitable for drinking purposes, which becomes of a quality not inferior to spring-water. I attain these objects by means of the apparatus illustrated in the accompanying drawings, in which—

Figure 1:
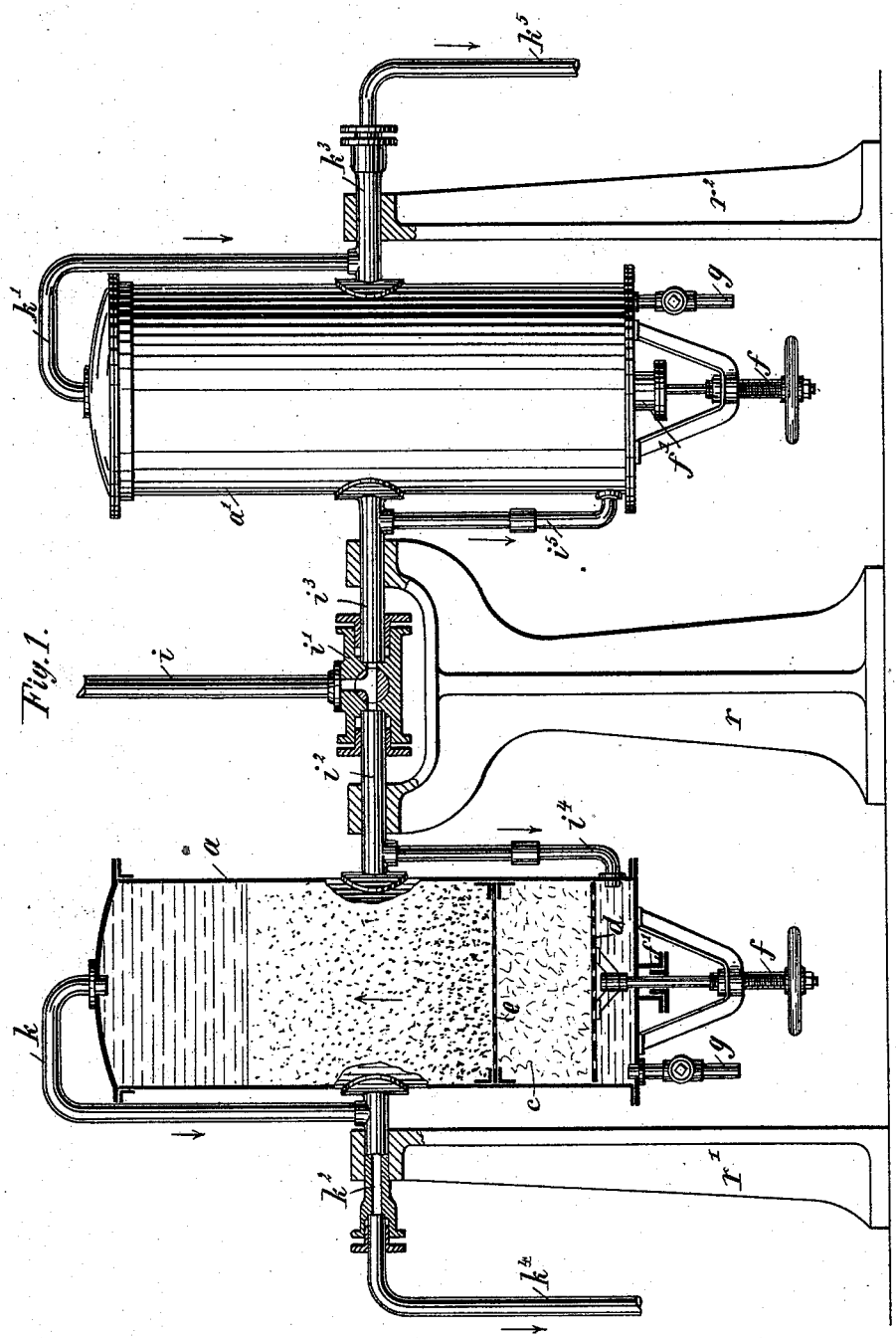
Figure 2:
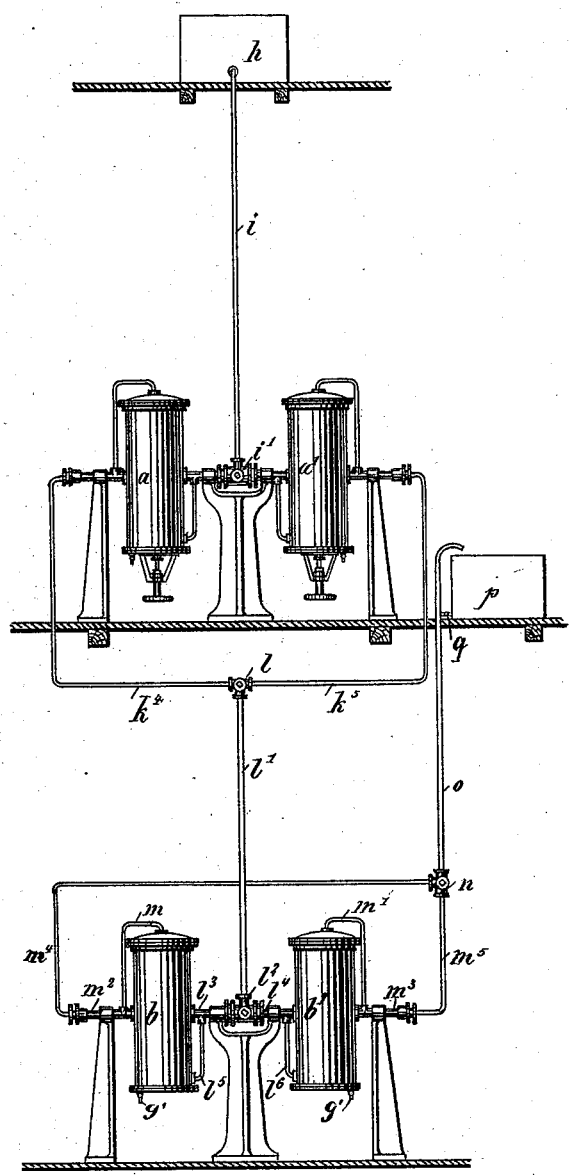

Figure 1 shows an elevation of a pair of primary filters partly in section. Fig. 2 represents the arrangement of a complete set of apparatus as employed for continuously working.

The primary filtration is effected under a pressure of about five-meter water-column, while the secondary filtration may already take place under a pressure of eight meters. In order to allow a permanent working, notwithstanding that the washing out of the filtering materials or the renewal of the same is required within certain periods, I make use of a series of filtering apparatus in each set of filters for both the primary and secondary filtering systems.

The apparatus employed for the primary filtration consists, preferably, of two or more cylindrical upright vessels, $a\ a'$, carried by trunnions $i^3\ k^2\ i^3\ k^3$, supported on suitable pillow-blocks, $r\ r'\ r^2$, allowing the filters to be turned in the vertical plane. The filtering material in these filters, consisting of sponges $c$, preferably impregnated with tannate of iron, forming an insoluble antiseptic precipitate in the pores of the filtering materials and preventing the development of any organic fermentative germs, is placed between two sieves or perforated plates, $d\ e$, the lower one, $d$, being fitted loosely within the vessels $a\ a'$, and may be moved in the axial direction of the latter by a screw, $f$, extending through a stuffing-box, $f'$, below the lower end of the vessel, for the purpose of pressing the sponges properly together and to squeeze out the residual impurities detained from the water. This pressing out of the sponges is of great advantage, as the cleaning of the same by properly-cleaned water, which passes the filtering materials in opposite direction of the flow of the water to be purified, will be considerably facilitated. Upon the upper perforated plate, $e$, may be placed in certain cases layers of pumice-stone of different sizes and previously treated by an insoluble iron salt, such as tannate of iron.

The apparatus to be used for the secondary filtration are essentially of the same construction, with the only difference that the mechanism for pressing the filtering material is omitted in these secondary cylindrical vessels, $b\ b'$, only layers of impregnated pumice-stones of different granulation being required.

The operation of the apparatus is as follows: The water, supplied from the main pipe $i$ of the water-works or reservoir under a certain pressure, enters through a three-way cock, $i'$, the hollow trunnions $i^2\ i^3$, and the branches $i^4\ i^5$, near the bottom of the first set of filters, $a\ a'$. The water passes upward through the impregnated sponges $c$ and, where it is desired, also through a layer of pumice-stone to the upper pipes, $k\ k'$, which conduct the partly-purified water through the hollow trunnions $k^2\ k^3$, the branches $k^4\ k^5$, the three-way cock $l$, pipe $l'$, three-way cock $l^2$, the hollow trunnions $l^3\ l^4$, and the branch pipes $l^5\ l^6$, near the bottom, to the second set of filters, $b\ b'$, placed at a level below that of the primary filters. The water passes again upward through the prepared pumice-stone to the upper pipes, $m\ m'$, the hollow trunnions $m^2\ m^3$, the branches $m^4\ m^5$, the three-way cock $n$, and the discharge-pipe $o$, to a reservoir, $p$. After the water has passed the prepared pumice-stone of the second set of filters it is fit for drinking purposes, perfectly pure and clear.

Wherever local circumstances will allow, I prefer as a special improvement to arrange both sets of filters (the primary and secondary) under equal pressure by placing the receptacle $p$ for the filtered water of the second set level with the primary set. By this arrangement the pressure in each set of filters is about half the height of the useful water-column.

Whenever the filtering material needs to be cleaned, this can be effected by previously-filtered water when reversing the flow of the water in the filter in a direction opposite to that which is employed for filtering purposes.

If it is intended to clean the filtering substances, for instance, in the vessel $a$, first the cock $g$ is opened and the three-way cock $i'$ regulated so as to conduct the water from the main pipe $i$ only into the vessel $a'$ and the three-way cock $l$, so as to allow the water from the filter $a'$ to enter into the vessel $a$ through the upper pipe, $k$. This mode of cleaning the filtering substances within the apparatus itself may be considerably improved by aid of the mechanism for squeezing out the sponges, while the impurities are thus washed off from the filtering materials by the reversed current of the water and drawn off through the cock $g$.

For cleaning the filtering material in the secondary filtering apparatus—for instance, in the vessel $b'$—the three-way cock $l^2$ is turned so as to allow the water coming from the primary filtering apparatus only to enter the vessel $b$, and as at the same time the three-way cock $n$ is so regulated that it conducts the water previously filtered through the vessel $b$ only into the vessel $b'$ through the branch $m'$ the impurities can be drawn off through the cock $g'$ at the bottom of the vessel. In most cases, however, I would prefer to employ the filtered water stored up in the reservoir $p$ for cleaning the filtering substances in the vessels for the secondary filtration, and for this reason the discharge-pipe $o$ can be brought in communication with the reservoir $p$ by means of the cock $q$ at the bottom of the reservoir. The water is then conducted through the pipe system $m^4$ $m^2$ $m$, respectively, $m^5$ $m^3$ $m'$ in reversed direction through the filtering substances in the apparatus, and the impurities drawn off, as aforesaid.

Whenever the renewal of the filtering materials is required, either one of the filters may be separated from the other by turning the respective three-way cock correspondingly, and then turning the one filter around its hollow trunnions, which are for this reason connected with the respective conducting-pipes and three-way cocks by means of stuffing-boxes, after which the upper cover can be easily removed. During this time it is not necessary to discontinue the filtration, as the water is in the meantime purified by the filters which remain intact.

I am aware that prior to my invention filtering apparatus have been made operating in conjunction with duly-impregnated and prepared sponges and pieces of pumice-stone in separate filtering-vessels. I therefore do not claim such a combination or system, broadly; but What I do claim as my invention, and desire to secure by Letters Patent, is—

In apparatus for filtering water by primary and secondary filtration, the combination of turnable primary and secondary filtering-vessels $a$ $a'$ and $b$ $b'$, arranged in series, with the three-way cocks $i'$, $l$, $l^2$, and $n$, the conducting-pipes, and hollow trunnions, substantially as and for the purpose specified.

In testimony that I claim the foregoing as my invention I have signed my name, in presence of two witnesses, this 31st day of October, 1888.

GEORGE DAVID GERSON.

Witnesses:
ALEXANDER SPECHT,
DIEDRICH PETERSEN.